United States Patent [19]

Kappes

[11] Patent Number: 4,877,674
[45] Date of Patent: Oct. 31, 1989

[54] DIRECT OVERWRAP FOR BAR SOAP

[75] Inventor: Kenneth C. Kappes, Hartland, Wis.

[73] Assignee: Milprint, Inc., Milwaukee, Wis.

[21] Appl. No.: 49,204

[22] Filed: May 13, 1987

[51] Int. Cl.$^4$ .................. B32B 23/02; B65D 81/26
[52] U.S. Cl. ................... 428/192; 428/201; 428/335; 428/343; 428/354; 428/537.5; 229/87 R; 206/204; 206/484
[58] Field of Search ............ 206/204, 484, 484.2, 206/524.2; 428/35, 124, 192, 201, 211, 76, 343, 351, 354, 537.4, 212, 215, 335, 334, 216; 156/145, 213, 269, 291; 53/461; 229/87 R

[56] References Cited

U.S. PATENT DOCUMENTS

| | | | |
|---|---|---|---|
| 3,249,218 | 5/1966 | Curler et al. | 206/524.2 |
| 3,776,798 | 12/1973 | Milano | 156/269 |
| 3,936,560 | 2/1976 | Santurri et al. | 428/220 |
| 3,990,872 | 11/1976 | Cullen | 206/204 |
| 4,164,588 | 8/1979 | Johnson | 206/585 |
| 4,184,902 | 1/1980 | Karami | 156/291 |
| 4,333,782 | 6/1982 | Pienlab | 156/22 A |
| 4,406,364 | 9/1983 | Bronander | 428/35 |
| 4,410,578 | 10/1983 | Miller | 206/204 |
| 4,489,118 | 12/1984 | Endres et al. | 428/192 |
| 4,629,064 | 12/1986 | Barner | 206/204 |
| 4,630,729 | 12/1986 | Hirt et al. | 150/291 |

Primary Examiner—Ellis P. Robinson
Assistant Examiner—Donald J. Loney
Attorney, Agent, or Firm—Fuller, Puerner & Hohenfeldt

[57] ABSTRACT

A single piece non-wrinkling wrapper for bars of soap is made from a lamina of sheets of a flexible plastic film and a water absorbent paper. The film and paper are superimposed and bonded together along their margins by bands of adhesive. The exposed surface of the paper sheet is coated with a cold seal cohesive along the margins in register with the adhesive bands. When wrapped around a bar of soap, the cohesive and adhesive fall in the back seal and end seal areas of the soap, thereby double wrapping the bar with the film and paper sheets and with an air space between the sheets which prevents or minimizes the wrinkling of the outer wrap. The wrappers may be made on a continuous basis from a wide web of film and paper that are bonded together along a grid-like pattern by means of bands of adhesive. The web is severed along the midpoints of the adhesive to form the individual wrappers.

6 Claims, 1 Drawing Sheet

U.S. Patent  Oct. 31, 1989  4,877,674
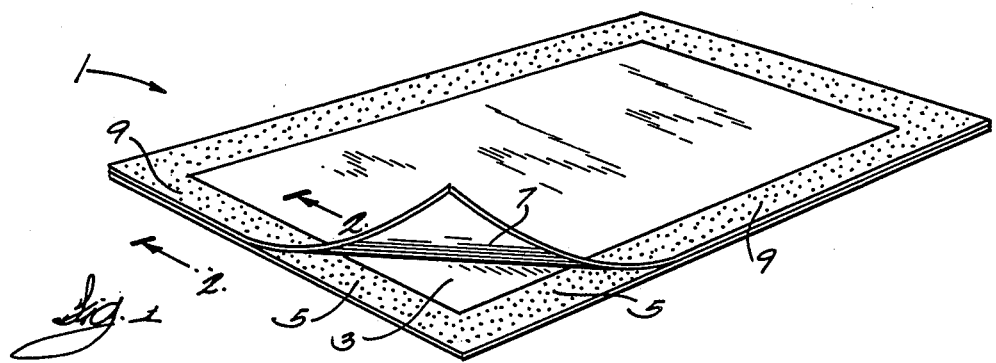
Fig. 1
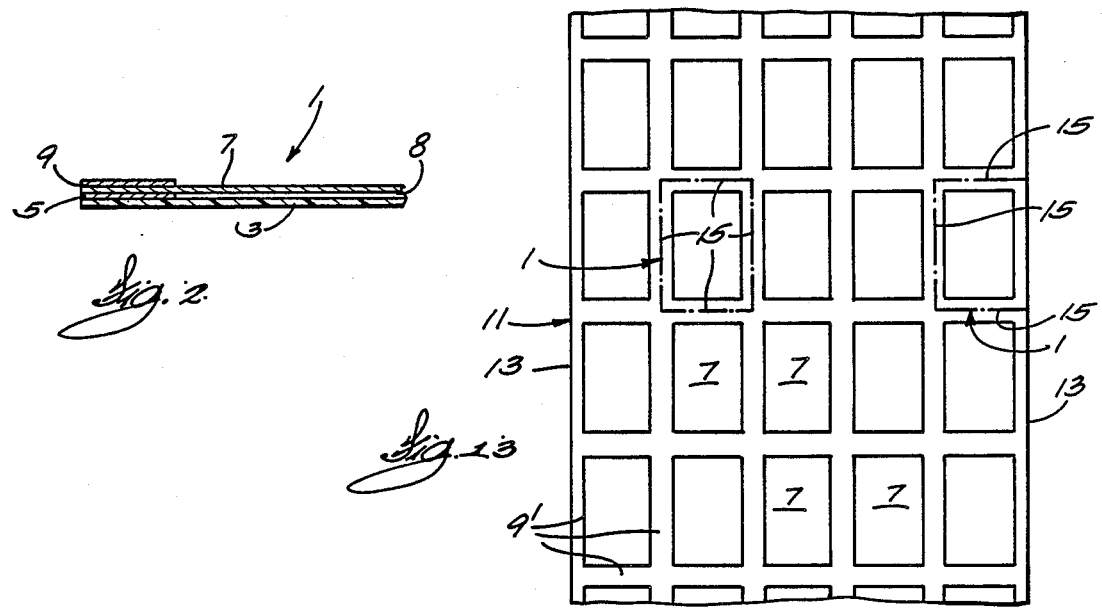
Fig. 2
Fig. 3
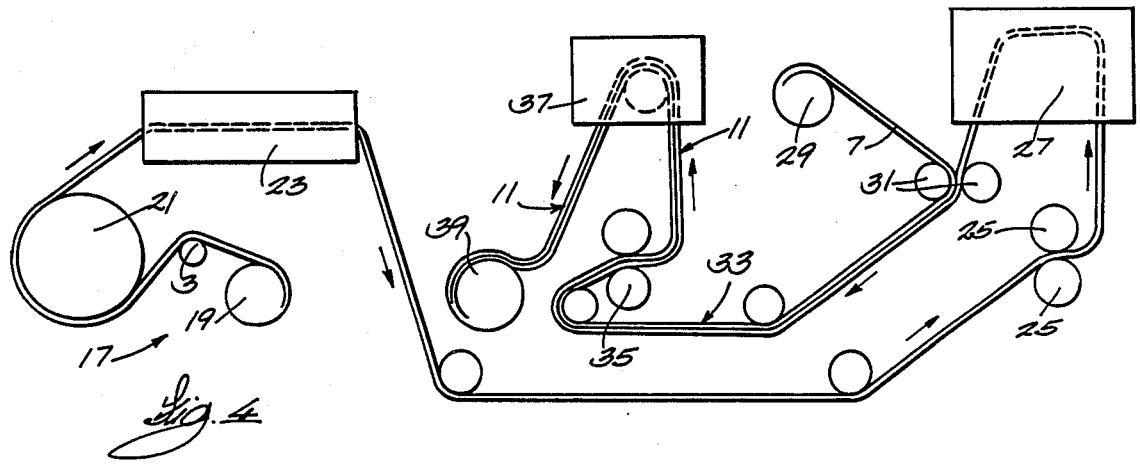
Fig. 4

DIRECT OVERWRAP FOR BAR SOAP

FIELD OF THE INVENTION

This invention pertains to wrappers, and more particularly, to wrappers for moist products.

BACKGROUND OF THE INVENTION

In the process of manufacturing and packaging bar soap, the soap is extruded in a sheet. The sheet is cut into pieces, and the pieces are placed in molds where the logo is embossed and the corners are shaped. A water solution is injected in and around the molds in order to release the formed bars from the molds. In order to control the moisture retained on the soap bars, an absorbent paper inner liner is wrapped around each bar to absorb the moisture. After the inner paper wrapping is wrapped around the bar soap, it is then overwrapped with a display wrapper. Some soap compositions have a particularly high retained moisture composition. Present soap wrappers use die-fold end seals which are not hermetically sealed and allow retained moisture to escape. Consequently, soap must be overpacked so as to be at listed net weight when sold. When bar soap is packaged in a plastic moisture proof wrapper with a hermetic seal specifically to avoid moisture loss, the retained moisture causes wrinkling of the wrapper which provides an unsatisfactory appearance.

SUMMARY OF THE INVENTION

In accordance with the present invention, a bar soap wrapper is provided that eliminates the prior separate inner layer of absorbent material. This is accomplished by apparatus that includes a one piece laminated wrapper that retains all the advantages of two piece bar soap wrappers.

The single piece wrapper is a laminate composed of two plys orsheet material that are generally separated by an air space formed by a non-adhered zone surrounded by a perimeter adhesive which bonds the two layers into a unitary laminate. The outer ply is a sheet of plastic film. The second and inner ply is an absorbent material. The margins of the two sheets are bonded together to create a two ply laminate with the non-adhered non-laminated zone between the sheets in the areas intermediate the margins.

The margins of the exposed surface of the absorbent inner layer are coated with a cold seal cohesive. The laminate is sized and shaped to fit around an individual bar of soap such that the cohesive coated margins cohere and form a complete and neat wrap. The margins containing the adhesive and cold seal cohesive fall on the back seal and end seal areas of the soap, thereby leaving it double wrapped with an air space between the two sheets. The inner sheet will cling to the soap, but the outer film sheet will not cling or wrinkle.

The laminate may be made on a continuous basis from a pair of webs that are brought into facing contact with each other. Before the webs are brought together, the longitudinal margins of at least one web are coated with adhesive, and longitudinally spaced transverse bands of adhesive are also applied to the web. The laminated webs are severed at the midpoints of the transverse bands of adhesive to produce the individual bar wrappers. The cohesive for securing the laminate around the bar is preferably applied to the margins of the paper sheet web in register with the adhesive. If desired, the adhesive and cold seal cohesive can be applied in a grid-like pattern to a wide web. Subsequent to lamination along the grids of adhesive, the composite web is severed longitudinally and transversely into the individual wrappers.

Other objects and advantages of the invention will become apparent to those skilled in the art upon reading the disclosure.

BRIEF DESCRIPTION OF THE DRAWINGS

FIG. 1 is a perspective view of the wrapper of the present invention;

FIG. 2 is an enlarged cross sectional view taken along lines 2—2 of FIG. 1;

FIG. 3 is a top view of a composite web from which a number of individual wrappers may be cut; and FIG. 4 is a schematic drawing of apparatus for manufacturing the wrapper of the present invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 and 2, a wrapper 1 is illustrated that includes the present invention. The wrapper 1 is especially useful for covering individual bars of soap, not illustrated herein. However, it will be understood that the invention is not limited to soap covering applications.

The wrapper 1 is comprised of a first layer of flexible sheet material 3 that is preferably waterproof. Particularly desirable materials include polyester and polypropylene plastic films. With either of those materials, a thickness of approximately .001 inches is satisfactory. In the illustrated construction, the sheet 3 is rectangular in shape, but it will be appreciated that the sheet may be made in any shape to suit the particular object it covers. If desired, the film can be pre-printed on either side with information pertinent to the product to be covered.

Along the margins of the sheet 3 are deposited bands 5 of an adhesive, which may be pressure sensitive. A second flexible sheet of material 7 that is complementary in shape and coterminous with the film 3 is superimposed on and secured thereto by means of the bands 5 of adhesive, thereby creating a two-ply laminate. An air space 8 exists in the non-adhered zone between the sheets 3 and 7 in the areas intermediate the adhesive bands 5. The second sheet 7 may be of any material. A preferred material is a paper product, such as a 27 pound sulfite paper. I have found that a paper layer thickness of approximately 0.003" gives excellent results. A paper layer of that thickness is sufficient to absorb the excess moisture from a soap bar and also adds stiffness to the film layer 3 without adversely affecting the wrapping process. If desired, a mold inhibitor can be incorporated into the paper layer.

Along the margins of the exposed side of the paper sheet 7 are deposited bands of a cold seal cohesive 9. It is preferred that cold seal cohesive 9 and the bands of adhesive 5 be of approximately the same width, so that the pattern of cohesive 9 is in register with the adhesive 5. The cold seal cohesive may be of any suitable material that coheres to itself upon contact.

Turning to FIG. 3, reference numeral 11 refers to a wide and continuous laminated web composed of film, paper sheet 7, bands of adhesive between the film and paper, and bands of cold seal cohesive 9'. The bands of adhesive and cold seal cohesive 9' are applied in a grid-like pattern, and, except for the bands along the web edges 13, they have twice the width of the bands 5 and 9 of FIGS. 1 and 2. The bands of adhesive between the film and paper are in register with the cold seal cohesive bands 9'. The web 11 may be made on a continuous basis, as will be explained subsequently. The web is severed longitudinally and transversely along the approximate midpoints of the cohesive bands 9', as illustrated by phantom lines 15, to create the individual wrappers 1.

FIG. 4 schematically depicts apparatus 17 for manufacturing the web 11 on a continuous basis. A parent roll 19 supplies a sheet of film 3, which is preferably wide enough to contain several wrappers 1 transversely across the film, as is illustrated in FIG. 3. The film passes across a print roll 21, which applies appropriate ink for printing selected information on the film. The inked film passes a dryer 23 for drying the ink. The dry sheet passes through a pair of applicator rolls 25 that apply a grid-like pattern of longitudinal and transverse bands of adhesive 5 that suit the width of the sheet. The adhesive is dried in a dryer 27. Upon leaving the dryer 27, the film is laminated to a continuous sheet of paper 7 supplied from a parent roll 29. The sheets of paper and film are laminated together by means of nip rolls 31, which apply pressure to the two sheets to enable the adhesive 5 to bond the two individual sheets into a composite unitary web 33. The composite web 33 next passes through applicator rolls 35 that apply a pattern of cold seal cohesive bands 9', thereby creating the web 11. The cold seal cohesive bands 9' are in register with the adhesive bands between the film and paper that were applied by the applicator 25. The cold seal cohesive is cured within curing apparatus 3. The completed web 11 is then wound on supply roll 39. The supply roll 39 of the completed web is shipped to the bar soap manufacturing facility. There, the web is severed along the midpoints of the bands of adhesive and cold seal cohesive corresponding to lines 15 of FIG. 3 to create the individual wrappers 1 as part of the bar soap manufacturing process.

Thus, it is apparent that there has been provided, in accordance with the invention, a direct overwrap for bar soap that fully satisfies the objects and advantages set forth above. While the invention has been described in conjunction with specfic embodiments thereof, it is evident that many alternatives, modifications, and variations will be apparent to those skilled in the art in light of the foregoing description. Accordinggly, it is intended to embrace all such alternatives, modifications, and variations as fall within the spirit and broad scope of the appended claims.

I claim:

1. A laminate comprising:
   a. a first rectangular sheet of thin flexible plastic material having a size and shape for wrapping around a selected object and having four marginal edges;
   b. a first band of adhesive deposited along the margins of the first sheet;
   c. a second sheet of thin flexible moisture absorbent material having four edges coterminous with the edges of said first sheet and superimposed on the first sheet and bonded thereto along a band line adjacent the margins thereof by means of the adhesive to form a nonadhered zone within the peripheral band line; and
   d. a second band of adhesive in the form of cold seal cohesive deposited around the margins of the exposed side of the second sheet above said first band, so that the laminate may be wrapped around a selected object and said second adhesive bands seal the edges of the object to thereby create a double layer of wrapping around the object so that wrinkling of said second sheet does not cause a corresponding wrinkling of said first sheet within said non-adhered zone with a layer of air between the two sheets.

2. The laminate of claim 1 wherein the cold seal cohesive is applied to the second sheet in registration with the adhesive applied to the first sheet.

3. A wrapper for bar soap comprising:
   a. a first rectangular sheet of flexible plastic water impervious material having four marginal edges;
   b. first bands of adhesive applied to said marginal edges of the first sheet;
   c. a second sheet of water absorbent material having marginal edges coterminous with the first sheet and bonded thereto along the margins by means of the adhesive to thereby create an air space between the first and second sheets intermediate the margins; and
   d. second bands of a cold seal cohesive applied to the exposed margins of the second sheet in register with the first adhesive bands, so that when the bar of soap is wrapped the second band of cold seal cohesive seals the end areas of the bar and form a complete enclosure for the bar.

4. The wrapper of claim 3 wherein:
   a. the first sheet is made of a plastic film approximately 0.001" thick; and
   b. the second sheet is made of an absorbent sulfite paper approximately 0.003" thick, so that the paper absorbs excess moisture from the soap and thereby prevents adverse effects of moisture on the plastic film.

5. A laminated web useful for making individual wrappings comprising:
   a. a first continuous sheet of flexible plastic material having longitudinal edges;
   b. a plurality of bands of adhesive applied longitudinally to the first sheet at least along the longitudinal edges thereof;
   c. a plurality of transverse bands of adhesive applied to the sheet between and adjoining the longitudinal bands;
   d. a second continuous sheet of flexible absorbent material having longitudinal edges in alignment with the first sheet longitudinal edges, the second sheet being bonded to the first sheet by means of the longitudinal and transverse bands of adhesive; and
   e. a plurality of longitudinal and transverse bands of cold seal cohesive applied to the exposed side of the second sheet in register with the longitudinal and transverse bands of adhesive, so that the web can be severed longitudinally and transversely along the respective bands of adhesive and cohesive to thereby form individual wrappers.

6. The laminated web of claim 5 wherein:
   a. the first sheet is composed of a flexible plastic film having a thickness of approximately 0.001"; and
   b. the second sheet is composed of an absorbent sulfite paper having a thickness of approximately 0.003", so that the individual wrappers cut from the laminated web are suitable for wrapping bars of soap.

* * * * *